(12) United States Patent
Kraska et al.

(10) Patent No.: US 9,805,216 B2
(45) Date of Patent: Oct. 31, 2017

(54) PRIVACY COMPLIANCE EVENT ANALYSIS SYSTEM

(71) Applicants: Eckehard Kraska, Gröbenzell (DE); Hans Jakob Thiersch, Tübingen (DE)

(72) Inventors: Eckehard Kraska, Gröbenzell (DE); Hans Jakob Thiersch, Tübingen (DE)

(73) Assignee: Eckehard Kraska, Grobenzell (DE)

( * ) Notice: Subject to any disclaimer, the term of this patent is extended or adjusted under 35 U.S.C. 154(b) by 50 days.

(21) Appl. No.: 14/843,506

(22) Filed: Sep. 2, 2015

(65) Prior Publication Data

US 2016/0063278 A1 Mar. 3, 2016

(30) Foreign Application Priority Data

Sep. 2, 2014 (EP) .................................. 14183152

(51) Int. Cl.
*H04L 29/06* (2006.01)
*G06F 21/62* (2013.01)
(Continued)

(52) U.S. Cl.
CPC ........ *G06F 21/6254* (2013.01); *G06F 21/602* (2013.01); *H04W 12/02* (2013.01)

(58) Field of Classification Search
CPC ... G06F 21/6254; G06F 21/602; H04W 12/02
(Continued)

(56) References Cited

U.S. PATENT DOCUMENTS

2011/0009715 A1* 1/2011 O'Reilly .............. A61B 5/0022
600/302
2012/0036356 A1 2/2012 Barbat et al.
(Continued)

FOREIGN PATENT DOCUMENTS

WO 2010086827 A2 8/2010
WO 2010086827 A3 8/2010

OTHER PUBLICATIONS

European Patent Office Communication re European Search Report, Application No. 14183152.9-1870, dated Nov. 2, 2015.
(Continued)

*Primary Examiner* — Michael S McNally

(57) ABSTRACT

This invention relates to a data system that anonymizes personalized event data, by receiving the personalized event data containing an encrypted personal identifier and determining whether an entry exists for the encrypted personal identifier in a key database. The encrypted personal identifier may be associated with a system identifier that uniquely identifies the encrypted personal identifier and is uniquely associated to one system identifier. If no entry is detected in the key database for the received encrypted personal identifier, then a new entry for the key database is generated in which the received encrypted personal identifier is uniquely associated to a new system identifier. The received encrypted personal identifier associated to the new system identifier is stored as the new entry in the key database and the new system identifier associated to the event data contained in the personalized event data in an event database is stored where the event database stores system identifiers in association with the corresponding event data.

16 Claims, 7 Drawing Sheets

(51) Int. Cl.
*G06F 21/60* (2013.01)
*H04W 12/02* (2009.01)

(58) Field of Classification Search
USPC .......................................................... 713/165
See application file for complete search history.

(56) References Cited

U.S. PATENT DOCUMENTS

| 2013/0191650 A1 | 7/2013 | Balakrishnan et al. |
| 2013/0212007 A1 | 8/2013 | Mattsson et al. |
| 2013/0318351 A1 | 11/2013 | Hirano et al. |

OTHER PUBLICATIONS

Radia Perlman, The Ephemerizer: Making Data Disappear, SUN Microsystems, Feb. 2005, pp. 1-17, Menlo Park, CA, USA.

* cited by examiner

| Field | Data type | Description |
|---|---|---|
| Encrypted Personal Identifier | String | Asymmetrically encrypted personal identifier |
| System Identifier | GUID | Generated, Unique System Identifiers |

*Fig. 3*

| Attribute | Data type | Description |
|---|---|---|
| System Identifier | GUID | Generated, Unique System Identifier of a person in the data system |
| Event Type | String | Type of event |
| Date | Datetime | Time of the event |
| Event Details | String | Details stored pertaining to the event |

*Fig. 4*

| Parameter | Data type | Description |
|---|---|---|
| Personal Identifier | String | Unique and already encoded association to a person, which is supplied by the external system. |
| Date | Datetime | Time of the event |
| Event Type | String | Type of event |
| Event Details | String | Here, any desired details pertaining to the event may be stored. |

*Fig. 5*

| Parameter | Data type | Description |
|---|---|---|
| Starting Date | Datetime | Date after which the events are reported |
| End Date | Datetime | Date before which the events are reported |
| Event Type | String | Type of reported events |

*Fig. 6*

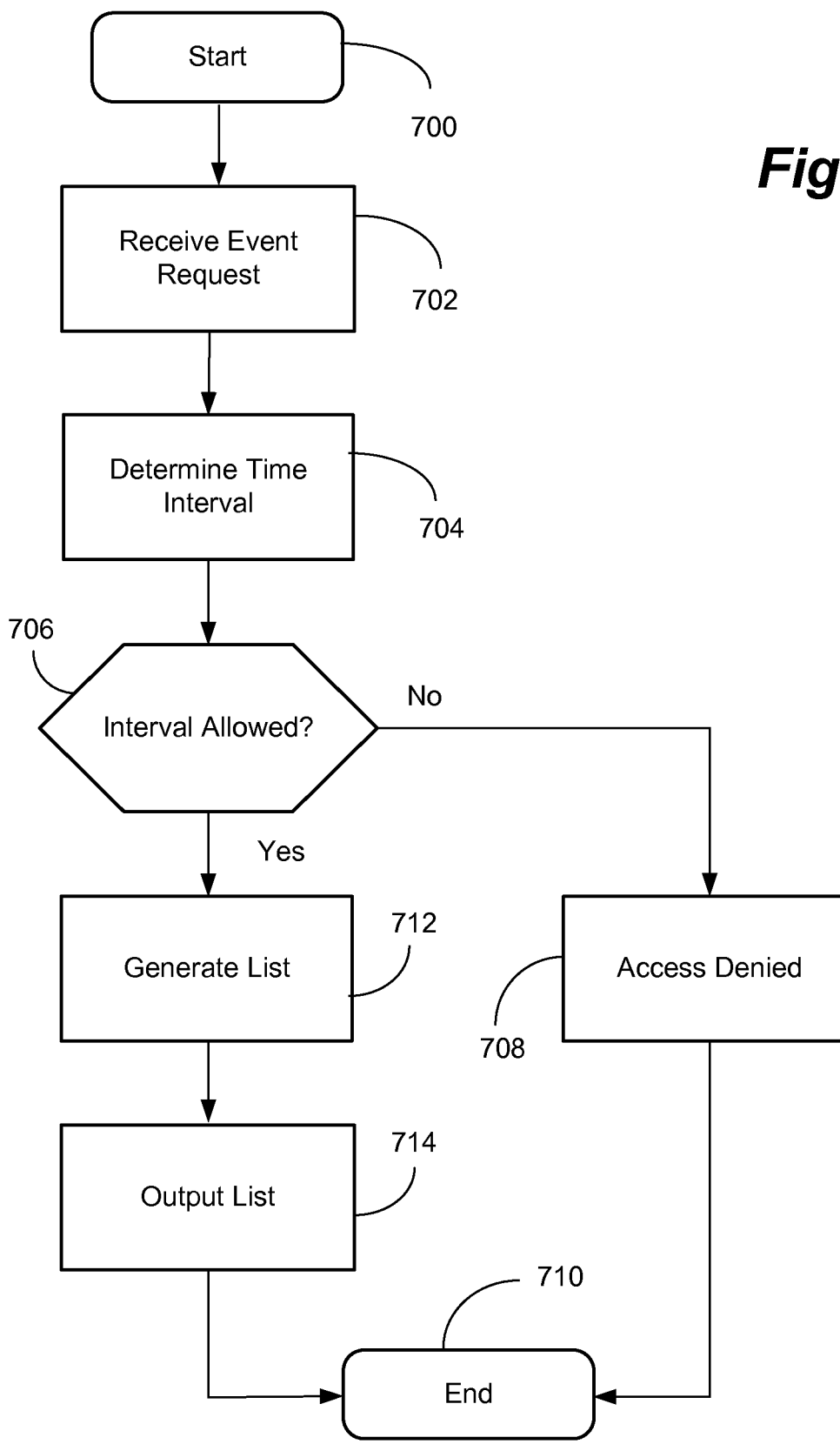

| Attribute | Data type | Description |
|---|---|---|
| System Identifier | GUID | Generated, Unique System Identifier of a person in the data system. |
| Date | Datetime | Date of the event |
| Event Details | String | Details stored pertaining to the event |

*Fig. 8*

PRIVACY COMPLIANCE EVENT ANALYSIS SYSTEM

CLAIM OF PRIORITY

This application claims priority to European Patent Application No. EP14183152 filed on Sep. 2, 2014 titled "Privacy Complaint Event Analysis" which is incorporated by reference in its entirety.

BACKGROUND OF THE INVENTION

Field of the Invention

This invention provides an event analysis system. Specifically, this invention provides an event analysis system that uses encryption to protect the privacy of event data.

Related Art

In today's economy, information about consumers or users is recognized as a primary and personal asset. Information data is an important asset not only for corporations and individuals and the privacy of such data is often essential. In many instances, the need to actively protect the privacy of an individual's data is essential to maintaining an electronic relationship with merchants and service providers.

The collection of personal information is, however, not allowed in many countries without the consent or approval of the corresponding individual. The data are considered to be personalized data if it is possible to determine the individual to which the data is related from the detected data. As a consequence, personalized data can often not be used for determining certain habits of a large amount of people as it is difficult, if not impossible, to obtain the consent of all the individuals involved. From an economical point of view, it is desirable to obtain further details of personal habits or consumer habits by analyzing streams of people. For example, many people carry mobile phones and each mobile phone emits a unique identifier that allows data systems to uniquely identify the mobile phone, e.g. the International Mobile Subscriber Identity ("IMSI"). This data can be uniquely associated with an individual with certainty. In many countries it is currently against the law to generate location-based profiles based on data emitted by mobile phones. Vehicle tracking information such as license plate numbers can also be directly associated with an individual the collection of such personalized data may not be allowed in many jurisdictions by commercial parties and individuals.

One possibility to anonymize personalized data would be the use of encryption techniques. The owner of the encryption method is normally able to decrypt the encrypted data so that the owner of the encryption technology can determine which individual is associated with an encrypted personal identifier. Thus, a need exists for an encryption event data management system that ensures the privacy of personal information and data thus allowing for the collection and storage of such data for current or later analysis.

Accordingly, a need exists to provide a possibility to collect personalized data while ensuring that the individual to which the personalized data relate cannot be identified.

SUMMARY

According to a first aspect, a data system, is provided of anonymizing personalized event data. According to one step, the personalized event data is received where the personalized event data can contain an encrypted personal identifier and event data.

An entry exists for the encrypted personal identifier in a key database of the data system in which the encrypted personal identifier may be determined by a comparison with data associated with a system identifier which uniquely identifies the encrypted personal identifier in the system. Each encrypted personal identifier is uniquely associated to one system identifier. If the system detects that no entry is detected in the key database for the received encrypted personal identifier, a new entry for the key database is generated in which the received encrypted personal identifier is uniquely associated with a new system identifier. The received encrypted personal identifier associated to the new system identifier is stored as a new entry in the key database. The new system identifier, associated to the event data contained in the personalized event data is stored in an event database, the event database storing system identifiers in association with the corresponding event data.

The system identifier is an identifier which allows the unique identification of the encrypted personal identifier in the data system. However, the system identifier does not allow the individual which generated the personalized event data to be identified. The event database contains the event data such as a date, when the event took place or was detected. The key database is provided to generate a link between the encrypted personal identifier and the system identifier. In a separate database of the data system, the event database, the event data are stored linked to the system identifier. When new personalized event data are received from the same individual, it is possible to determine using the key database for the same individual whether an event has already been detected so that this event can be stored associated to the system identifier already contained in the event database. As the received personal data is received as encrypted personal identifier, e.g. encrypted by the detector 102 detecting the personalized event data and as the data system does not have a key to decrypt the encrypted personal identifier, the data system cannot identify the individual behind the personalized event data. Only the encrypted personal identifier is used by the data system, as the data system is not able to decrypt the encrypted personal identifier. Thus, a privacy compliant event analysis is obtained.

The data system comprises a key database, an event database, a receiver configured to receive the personalized event data including the encrypted person identifier and a control unit which controls the data system. The data system can furthermore comprise an encryption module configured to further encrypt the cipher text of the received encrypted personal identifier using asymmetric or public key encryption. The data system may be designed in such a way that every time the data system is started a new key is generated which is used for the asymmetric encryption. Symmetric encryption may also be used to protect the privacy of the data.

The data system may be further configured in such a way that if a request other than an event request is detected, the control unit could delete either the key database or even database or both databases. The control unit only allows an output of data stored in the event database, but does not allow an output of data stored in the key database. The key database and the event database are stored in none-persistent memories. Thus, when the power is shut off, the system is destroyed as no data are persistently stored in the event database or key database.

Other systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DETAILED DESCRIPTION OF THE DRAWINGS

The components in the figures are not necessarily to scale, emphasis being placed instead upon illustrating the principles of the invention. In the figures, like reference numerals designate corresponding parts throughout the different views.

FIG. 3 is a table describing the content of a key database provided in the data system of FIG. 2.

FIG. 4 is a table with data contained in an event database contained in the data system of FIG. 2.

FIG. 5 is a table of personalized event data received by the data system shown in FIG. 2.

FIG. 6 is a table with the input parameters input into the data system in a request for data output.

FIG. 7 is a flowchart including the steps to check whether event data are output or not.

FIG. 8 is a table including the output parameters output in response to an event request.

DETAILED DESCRIPTION

The data system can detect personalized event data by a detector where the personalized event data is collected and processed in such a way that it is possible to analyze the collected event data in a manner where it is not readily possible to deduce the individual involved in the event so that a privacy compliant event analysis is possible. A situation considered an event could be the fact that an individual having a mobile phone passes a certain location where a detector is located which detects an identity of the mobile phone, e.g. identifier transmitted by the mobile phone and used by a mobile communications network to uniquely identify the mobile phone. Another scenario could be where a vehicle passes a detector and the vehicle has a uniquely identifiable license plate number where the detector detects the license plate, e.g. by taking pictures of the license plate, reading the digital image of the letters, symbols and/or numbers on the license plate and identifies the characters on the license plate using pattern recognition techniques and comparing the characters to know vehicle registrations in a database.

Figure 1:
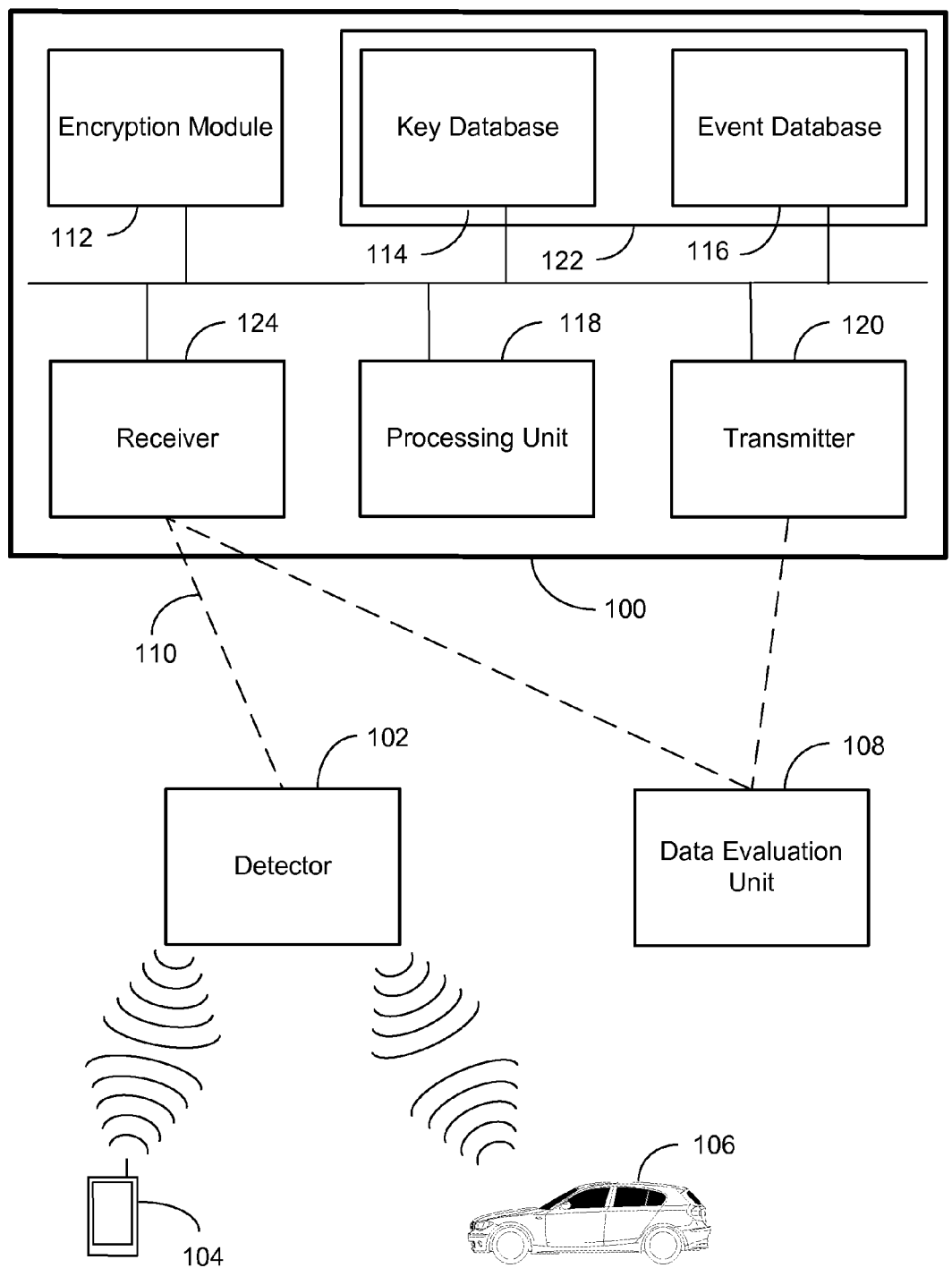
FIG. 1 is a schematic block diagram of a data system which carries out the process steps shown in FIG. 2.
Figure 2:
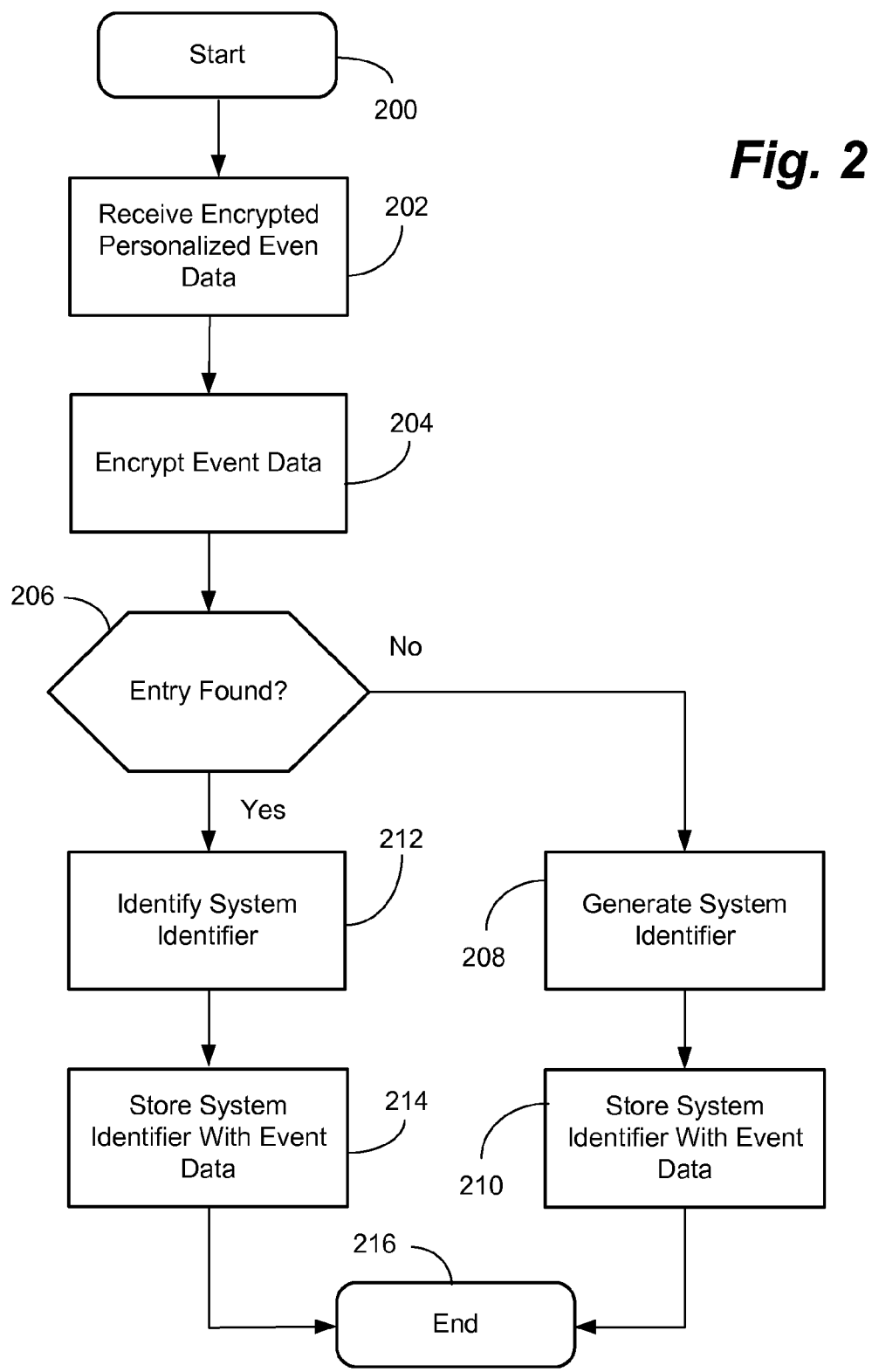
FIG. 2 is a flow chart illustrating the process steps carried out by a data system in which the collection of personalized event data, however, in which the identification of the individual who generated the event is not possible.

FIG. 1 is a schematic block diagram of a data system 100 which carries out the process steps shown in FIG. 2. A detector 102 can detect the personalized event data. The detector 102 encrypts personalized event data using asymmetric or public encryption technique with a key that is only known to the detector 102. The encrypted personalized event data which comprise an encrypted personal identifier such as an identifier allowing a mobile phone 104 to be identified in mobile communications network or a license plate number of a vehicle 106 and event data such as a location, a time when the event has been detected and possibly further event details are transmitted to a data system 100.

In one embodiment, the event data only contains the date so that the received data only includes the encrypted personal identifier and the event date. Referring back to FIG. 2, this means that after a start of the method in step 200, encrypted personalized event data are received by the data system 100 in step 202. The personal identifier, which uniquely identifies the individual who triggered the event is encrypted using asymmetric encryption, where the event data itself contains event details that are not encrypted. If the event data is encrypted, the event data is encrypted in such a way that the data system 100 and/or a data evaluation unit 104 can decrypt the event data in order to be able to read and understand the event data. The data system 100 may be configured so that the data evaluation unit cannot decrypt the personal identifier.

The data system 100 further encrypts the received encrypted personalized event data. This means that in step 204, the already encrypted personal identifier received from detector 102 is further encrypted. Thus, a ciphertext is used as a basis for the encryption in step 204 and not the plaintext. The data system 100 is typically not able to generate the plaintext of the encrypted personal identifier. The encryption in step 104 can be achieved using a further asymmetrical or public key encryption using a key that is only known to the data system 100. The data system 100 of FIG. 1 can be configured in such a way that each time the data system 100 is started again the key used for the encryption step 204 is automatically generated.

Referring back to FIG. 1, this can mean that the personalized event data including the encrypted personal identifier and the event data itself are transmitted from the detector 102 using a wired or wireless connection 110 and are received by the data system 100 by a receiver 124. The encryption carried out in step 204 can be generated by an encryption module 112, the encryption module 112 generating the key and encrypting the received personalized event data.

The data system 100 furthermore comprises a key database 114. The key database 114 stores the received encrypted personal identifier which may be further encrypted in step 204 using the encryption of the data system 100 in association with a system identifier which uniquely identifies the encrypted personal identifier. Thus, in the key database 114 for each encrypted personal identifier a system identifier is provided. The system identifier is the identifier that is used by the data system 100 to associate events to an individual. However, the system identifier is designed in such a way that with the system identifier it is not possible to identify the personal identifier received from the detector 102. An event database 116 is provided where the event database 116 includes different event elements and each event element contains a system identifier and the corresponding event data. Thus, the data system 100 stores in the event database 116 each event received from the detector 102 in connection with a corresponding system identifier. The system identifier can inter alia help to determine whether an event is related to the same individual or not. A processing unit 118 is responsible for the controlling and for the functioning of the data system 100 and a transmitter 120 is provided to transmit event lists to the data evaluation unit 104. The encryption module 112 can decrypt the event data if stored in an encrypted format in the event database 116 before the event data are output in response to an event request.

Referring to FIG. 2, it is checked after step 204 and step 206 whether an entry can be found in the key database 114 which associates the received encrypted personal identifier with a corresponding system identifier. As all the received personalized event data were encrypted by the detector 102 using a certain encryption key and as all the received personalized event data were further encrypted by encryption module 112 using a certain encryption key which is different from the encryption key used by the detector 102, the data system 100 can determine whether an entry exists for the encrypted personal identifier in the key database 114. If this is not the case, meaning that the individual generating the event is detected by the detector 102 for the first time, a system identifier is generated in step 208 for the received encrypted personal identifier. In step 210, the generated new system identifier is stored in the event database 116 in connection with the event data received in step 202 so that a new event element is generated.

If it is determined in step 204 that an entry is found in the database, which associates the encrypted personal identifier with an already existing system identifier, the system identifier that is stored in association with the received personal identifier is identified in step 212. Even though the data system 100 is not able to decrypt the received encrypted personal identifier and further encrypts the encrypted personalized event data, the data system 100, especially the processing unit 118 can compare the ciphertext of the received personal identifier further encrypted by step 204 to the ciphered text stored in the key database 114. Thus, the processing unit 118 can determine, without being able to identify the human being behind the personalized event data, whether an event has been received from the same device or not. If it is determined in step 212 that a system identifier is already stored in the key database 114 for the received encrypted personal identifier, the system identifier is stored in connection with the event data received in step 202 in connection with FIG. 4 (214). The method ends in step 216.

The key database 114 and the event database 116 may stored in a non-persistent memory so that when the power of the data system 100 is shut off, all data in the key database 114 and the event database 116 are lost. The use of non-persistent memory may be used to ensure that unauthorized third parties do not readily gain access to privacy sensitive data. Such a scenario may occur if the computer is stolen or the memory is removed and re-used in another computer system.

Furthermore, the transmitter 120 can be configured in such a way that it only transmits event data in connection with FIGS. 5 through 8. If the processing unit 118 detects that an unauthorized user tries to access the system and to extract other data than the data stored in the event database 116, the control unit can be designed to automatically destroy the data in the key database 114 and event database 116.

The data system 100 furthermore comprises a memory 122, which can be a read only memory, a random access memory, a hard disk or the like. The memory 122 can store suitable program code to be carried out by the processing unit 118 in order to carry out the steps in which the data system 100 is involved. The memory 122 can contain a key database 114 and the event database 116. However, it should be understood that the key database 114 or the event database 116 may be stored separately from memory 122.

The data system 100 shown in FIG. 1 illustrates the different functional modules. It should be understood that the data system 100 can comprise other entities or functional modules and that the different functional modules need not to be provided in the shown separation of entities. Furthermore, the modules may be incorporated by hardware or software or a combination of hardware and software.

FIG. 3 shows one example of a table contained in the key database 114. The key database 114 contains the encrypted personal identifier as received from detector 102, which may be a string data type and which could be described as an asymmetrically encrypted personal context. This encrypted personal identifier would in general allow the unique identification of a device and subsequently an individual which could be a subscriber of a mobile network or an individual having a vehicle with a certain license plate number. The system identifier, which can be of a Globally Unique Identifier ("GUID") data type, is an identifier generated by the data system 100 and has a unique reference number used by the system to identify an encrypted personal identifier. The system identifier at least uniquely identifies the identifier within the system. The data system 100 does not contain an interface which outputs the encrypted personal identifier for an associated system identifier.

In FIG. 4 an example of the event database 116 is shown in more detail. The event database 116 contains the system identifier, which is a unique reference number. Without accessing the key database 114, the event database 116 cannot determine the encrypted personal identifier which is associated with the system identifier. A further attribute stored in the event database 116 can be the type of event, e.g., which kind of event was detected by the detector 100. Furthermore, the event data may contain the date of the event and further event details. As can be seen in FIG. 4, the event database 116 stores the events in connection with the system identifier and not in connection with the encrypted personal identifier. Preferably, the event database 116 only contains the system identifier and the date of the event. In another embodiment, the event data contains further information, such as the event type (e.g. detection of subscriber identity of a mobile phone) and event details such as where the event took place, e.g., where the detector 102 providing the data is located.

FIG. 5 shows an example of the personalized encrypted event data generated by the detector 102 and received by receiver 124. It contains the personal identifier as unique and already encrypted correlation with an individual. Furthermore, it contains the date, the event type and the event details. Thus, a data set is received by the receiver 124 and is stored in the event database 116 as an event element as shown in FIG. 4.

As explained in connection with FIGS. 6-8, the data stored in the event database 116 can be analyzed using the data evaluation unit 104. For example, the user of the data evaluation unit 104 can input the parameters shown in the table of FIG. 6, meaning that the user can input a starting date indicating the starting time after which events should be collected. Furthermore, as a further input parameter the user may input an end date until when events should be reported. An event request can contain as an input the event type indicating which type of event the user of the data evaluation unit is interested in if the event type is included in the event database 116. The processing unit 118 then checks the event database 116 and collects the event elements as input parameters as shown in FIG. 6. All these event elements can be stored in an event list which is then output by a transmitter 116 of the data system 100.

In order to further improve the security of the system, the output of event data can be limited to a certain time interval. For example, the data system 100 can be configured in such a way that event requests sent by the data evaluation unit 104 to the data system 100 are only allowed when the time interval included in the event request ends some days, weeks or months ago. For example, if an individual passing the detector 102 is known by someone who evaluates the data transmitted to the data evaluation unit, and if event requests were possible including recent data, and if only very few events occurred on that date, a user of the data evaluation unit could deduce from the output system ID the personal identifier. If the system only outputs data that are older than a certain date, this situation can be avoided.

A key used for asymmetric encryption of the cipher text of the encrypted personal identifier can be automatically deleted when a request for a data output other than the new system identifier or event data is detected. This key may be also deleted when the system is restarted. Key use is described in further detail in FIG. 7. After the start of the method in step 700, an event request is received by the data system 100 in step 702 requesting the output of an event list, the event request including a time interval for which events should be output. In step 704, this time interval is determined and it is checked in step 706 whether this time interval is in agreement with the predefined time interval stored in the data system 100. Furthermore, the predefined time interval can indicate the oldest possible event stored in a system. For example, the data system 100 can be configured in such a way that all data events that are older than a certain date are automatically erased from the event database 116, e.g. older than one year, than two years, or older than six months, etc. If it is determined in step 706 that the time interval contained in the request is not within the allowed time interval, then access to the event database 116 is denied in step 708 and the process ends 710. The user of the data evaluation unit may be informed accordingly. If the time interval contained in the request is allowed by the system, a list is generated in step 712 which contains all the event elements shown in FIG. 8 in the requested time interval and the list is output in step 714 and the method ends in step 710.

The security of the data system 100 can be further improved by providing a system which, when the data system 100 is started, requests the input of all parameters needed by the system such as how the personalized event data received from the detector 102 look like, what data events can be collected and output, in which time interval a request for data events is possible, etc. These parameters are valid until the system is shut down. When the system is shut down, all the data in the key database 114 and the event database 116 are deleted and when the system is restarted, new data can be collected based on the input parameters to be input by an operator of the data system 100.

The system shown in FIG. 1 may also be adapted to be used by different users. For example, one user interested in a first kind of data provided by the data evaluation unit 104 uses the data system 100, whereas the data system 100 also collects personalized event data for another user which is different from the event data collected for the first user. For example, for one user the system may collect identifiers of a mobile entity in a telecommunications network, whereas for another user the system collects license plate numbers. For each of the users, the modules shown in FIG. 1 may be provided in the data system 100, thus each of the modules 112, 114, 116, 118, 120 and 124.

In another embodiment, some of the receiver 124 and transmitter 120 modules may be used by multiple users. However, different key databases 114 and event databases 116 can be provided for the different users. In another embodiment the key database 114 or the event database 116 have a further parameter or attribute, namely the attribute user. This allows the storage of event data for different users. Each user could then only request event data relating to events that are stored for the user. The data system 100 may then comprise a user identification part either within the data system 100 or outside the data system, which can identify which user is requesting the event data.

A further possibility to additionally improve the security and to avoid the identification of the individuals behind the data is the following: the association of the encrypted personal identifier to a system identifier can be changed after a certain period of time. For example, after three or four months the individuals contained in the system receive a new system identifier. This means that an individual in the first time period, e.g. the first three months has another system identifier than in another time period, e.g. the second three months. With this change of the system identifier, it can be avoided that real individuals can be identified by analyzing the events over a very long period of time.

Another possibility to improve the security of the system can be seen in an embodiment where the date contained in the event database 116 is replaced by a time identifier which is not related to the date at all. For example, without this replacement, an event element could indicate for an individual P1 on date XX/YY/ZZZZ the events E1 and E2 have been detected if the type of event is stored in the database. This information could be replaced by the information for individual P1 on date ID 1234 the events E1 and E2 were detected. In such a system, one has to make sure that each time identifier is associated with a single date, e.g. a single day. This can make sure that one time identifier is generated for each day. If the smallest possible time interval is one week, then a time identifier is associated with each single week. Furthermore, as the event data are requested for a certain time interval, the system could be defined in such a way that event requests are possible only in predefined time intervals, such as a whole week, a whole months, a whole quarter of a year, a whole year. Otherwise, the likelihood is increased that with the time interval indicating a starting time and an end time it is possible to deduce therefrom the relationship between date and time identifier.

Figure 9:
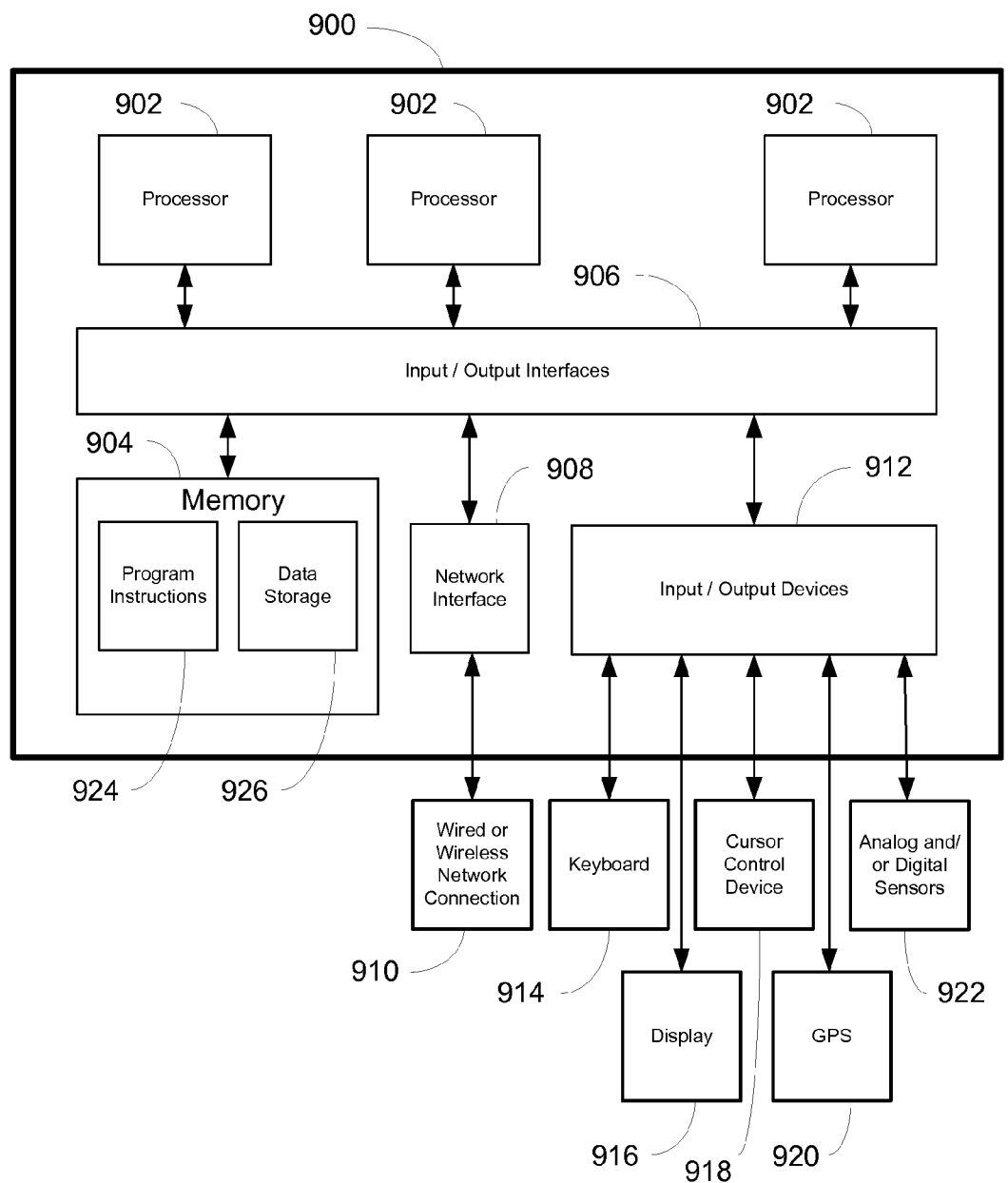
FIG. 9 is a block diagram of a computer system layout for running the encryption system.

A processing unit 118 comprising a processing unit with one or more processors 902 as described in FIG. 9, and a memory 904 where the memory contains instructions executable by the processing unit 118 where the data system 100 is operative to carry out the steps of the process. The processing unit 118 may comprise a single processor with a single processor core or a plurality of processing cores. Also the processing unit 118 may comprise a plurality of processors with one or more cores. It is operative to receive the personalized event data which contain the encrypted personal identifier and the event data. It is also operative to determine whether an entry exists for the encrypted personal identifier in a key database 114 of the data system 100 in which the encrypted personal identifier is associated with a system identifier which uniquely identifies the encrypted personal identifier in the data system 100, where each encrypted personal identifier is uniquely associated to one system identifier. If no entry is detected in the key database 114 for the received encrypted personal identifier, the data system 100 is operative to generate a new entry for the key database 114 in which the received encrypted personal identifier is uniquely associated to a new system identifier. It is furthermore operative to store the received encrypted personal identifier associated to the new system identifier as new entry in the key database 114 and to store the new system identifier associated to the event data contained in the personalized event data in an event database 116, where the event database 116 stores the system identifier in association with the corresponding event data.

Preferably, the step of determining whether an entry exists for the encrypted personal identifier in the key database 114 is carried out on the bases of a ciphertext of the encrypted personal identifier. As the data system 100 does not have a key to decrypt the encrypted personal identifier, the system cannot use the plaintext of the personal identifier but uses the encoded information which is unreadable by a human or a computer. Thus, the data system 100 uses the ciphertext of the encrypted personal identifier to determine whether an entry exists in the key database 114. The detector 102 detecting the personalized event data and encrypting the personal identifier will preferably use the same identifier for different pieces of personalized event data as otherwise, the data system 100 cannot determine the personal identifier relates to the same individual or not.

Thus, the data system 100 is able to determine that an event can be associated with the same individual; however, it typically cannot identify the individual as no possibilities are provided to decrypt the received encrypted personal identifier.

Furthermore, it is possible that the ciphertext of the encrypted personal identifier is further encrypted by the data system 100 using asymmetric encryption before it is determined whether an entry exists in the key database 114 for the encrypted personal identifier. The encrypted personal identifiers contained in the entries of the key database 114 were further encrypted by the data system 100 using the same asymmetric encryption before storing. The data system 100, on the bases of the already encrypted personal identifier, uses a second encryption and stores the personal identifiers in an encrypted way, preferably using asymmetric or public key cryptography techniques.

If an entry is detected in the key database 114 for the received encrypted personal identifier, the system identifier associated with the received encrypted personal identifier is determined and the event data is stored in the event database 116 as an event element in which the system identifier is associated with the event data.

Here it is possible to associate an already existing event element or an already existing system identifier with new event data that were received in the personalized event data. When the event database 116 is then evaluated, it can be deduced how often an event occurred for an individual.

The event data only comprises a date when the event took place or when the event was detected. An event request may be received by the data system 100 requesting information about events occurring at a certain time interval included in the event request. The event elements in the event database 116 having a date lying in the time interval contained in the event request are determined and stored in an event list and the event list can then output a response to the event request. For the evaluation of the data in the event database 116, it is possible to evaluate what events occurred at a certain time interval and how often events occurred in a certain time interval, e.g. how often an individual passed the detector 102 where the personalized event data were detected.

In order to limit the data evaluation possibilities, it is possible to check whether the time interval contained in the event request is lying in a predefined system time interval predefined in the data system 100. If it is determined that the time interval contained in the event request is not inside the predefined system time interval, then the access to the event database 116 in response to the event request may be denied. Here, the time period for which the personalized data can be analyzed, can be limited, e.g. it is only possible to analyze data that is older than e.g. one day, one week or one month. If new data contained in the event database 116 could be retrieved and analyzed, it could be possible to conclude on certain individuals if it is known that a certain individual has generated a certain event at a certain time. Furthermore, it is possible that event elements in the event database 116 which are associated with a data that is older than a predefined date are automatically deleted. This further helps to improve the security of the system so that the event database 116 does not contain any data older than a predefined date. Thus, the analysis of very long periods of time can be avoided.

The date contained in the event database 116 may be replaced by a time identifier which uniquely identifies a certain date, where the time identifier is designed in such a way that no conclusions are possibly to deduce the date from the time identifier. With this feature it can be avoided that in knowledge of certain event, it would be possible to analyze further events of the same individual. Here, the output of the event database 116 would not be that for an individual P1 the events occurred on date XX/YY/ZZZZ as in the normal case. When the time identifier is used, the result could be for an individual P1 the events occurred at date ID XYZ.

In another embodiment, a first new system identifier is generated for the received encrypted personal identifier in a first time interval and a second new system identifier is generated for the received encrypted personal identifier, for a different time interval, the second personal identifier being different from the first new personal identifier. With this generation of different system identifiers, the security is further improved as it is less likely that on the basis of the events it is possible to conclude on the individual. For example, every three or four months, the generation of the system identifier based on the encrypted personal identifier can be changed so that each individual receives a new system identifier. With this feature long term evaluations relating to certain individuals are avoided. In summary, the data system 100 collects personalized event data while avoiding the identification of the individual(s) behind the events.

FIG. 9 is a block diagram of a computer system layout for running the data system 100. One such computer system is illustrated by FIG. 9. The computer system 900 may include one or more processors or processor cores 902 that are connected to and interface with a system memory 904 via an input/output (I/O) interface 906. The computer system 900 further includes a network interface 908 coupled to I/O interface 906 and connected to a wired or wireless network connection 910. Also connected to the input/output device 906 may be one or more input/output devices 912, such as keyboard 914, display(s) 916, cursor control device 918, a global positioning system ("GPS") 920, audio device (not shown), analog and/or digital sensors 922 and/or some other device. In some embodiments, it may be contemplated and may need to be implemented using a single instance of a computer system 900, while in other embodiments multiple systems 900 may be included or multiple nodes making up the computer system 900, may be configured to host different portions or instances of the embodiments. For example, in one embodiment some elements may be implemented via one or more nodes of computer system 900 that are distinct from those nodes implementing other elements.

In various embodiments, the computer system 900 may be a uniprocessor system including only one processor 902 or processor core, or a multiprocessor system including a plurality of processors or processor cores 902. Processors 902 may be any suitable processor capable of executing instructions. For example, in various embodiments, processor(s) 902 may be general-purpose or embedded processors implementing any of a variety of instruction set architectures ("ISAs"), such as the x86 (e.g. x86, x86-32, x86-64, and subsequent generations), PowerPC or Power ISA architectures, Reduced Instruction Set Computer ("RISC"), Complex Instruction Set Computer ("CISC"), Scalable Processor Architecture ("SPARC"), or Microprocessor without Interlocked Pipeline Stages ("MIPS") architecture, or any other suitable ISA, including derivative versions of this list or new architectures that may displace this list. In multiprocessor systems, each of the processors 902 may commonly, but not necessarily, implement the same ISA.

System memory 904 may be configured to store program instructions and/or data accessible by the processor(s) 910. In various embodiments, the system memory 904 may be implemented using any suitable memory technology, such as Static Random Access Memory ("SRAM"), Synchronous Dynamic RAM ("SDRAM"), nonvolatile/Flash-type memory, phase change, or any other type of memory. In the illustrated embodiment, program instructions and data implementing desired functions, such as those described for providing guidance to an excavator operator or providing automated control instructions to an excavator are shown stored within the system memory 904 as program instructions 924 and data storage 926, respectively. In other embodiments, the program instructions and/or data may be received, sent or stored upon different types of computer-accessible media or on similar media separate from system memory 904 or the computer system 900. Generally speaking, a computer-accessible medium may include storage media or memory media such as magnetic or optical media, e.g., optical disks such as CDs, DVD-ROM or other variants coupled to the computer system 900 via the I/O interface 906. The program instructions and data stored via a computer-accessible medium may be transmitted by transmission media or signals such as electrical, electromagnetic, optical or digital signals, which may be conveyed via a communication medium such as a network and/or a wired or wireless link, such as may be implemented via network interface 908.

In one embodiment, the I/O interface 906 may be configured to coordinate I/O traffic between the processor(s) 902, the system memory 904, and any peripheral devices including network interface 908 or other peripheral interfaces, such as the input/output devices 912. In other embodiments, the I/O interface 906 may perform any necessary protocol, timing or other data transformations to convert data signals from one component (e.g., system memory 904) into a format suitable for use by another component (e.g., processor 902). In still other embodiments, the I/O interface 906 may include support for devices attached through various types of peripheral buses, such as a variant of the Peripheral Component Interconnect ("PCI") bus standard, the Universal Serial Bus ("USB") standard, or any other similar peripheral bus standard. In some embodiments, the function of the I/O interface 906 may be split into two or more separate components, such as a north bridge and a south bridge. In addition, in some embodiments some or all of the functionality of the I/O interface 906, such as an interface to system memory 904, may be incorporated directly into the processor(s) 902.

The network interface 908 may be configured to allow data to be exchanged between the computer system 900 and other devices attached to a network, such as other computer systems, or between nodes of computer system 900. In various embodiments, the network interface 908 may support communication via wired or wireless general data networks, such as any suitable type of Ethernet network, via telecommunications/telephony networks such as analog voice networks or digital fiber communications networks; via storage area networks such as Fibre Channel SANs, or via any other suitable type of network and/or protocol.

Input/output devices 912 may, in some embodiments, include one or more display terminals, keyboards, keypads, touchpads, scanning devices, voice or optical recognition devices, analog or digital sensors 922 or any other devices suitable for entering or retrieving data by one or more computer system 900. Multiple input/output devices 912 may be present in the computer system 900 or may be distributed on various nodes of the computer system 900. In some embodiments, similar input/output devices may be separate from the computer system 900 and may interact with one or more nodes of the computer system 900 through a wired or wireless connection, such as over a network interface 908.

As shown in FIG. 9, the memory 904 may include program instructions 924, configured to implement embodiments providing guidance to an excavator operator or providing automated control instructions to an excavator and related data storage 926, comprising various data accessible by the program instructions 924. In one embodiment, the program instructions 924 may include software elements for providing guidance to a user for providing selected documents for viewing. The data storage 926 may include data that may be used in some of the embodiments while in other embodiments the different software elements and data may be included.

Those skilled in the art will appreciate that computer system 900 is merely illustrative and is not intended to limit the scope of a software methodology for providing guidance to an excavator operator or providing automated control instructions to an excavator. In particular, the computer system 900 and the Input/Output devices 912 may include any combination of hardware or software that can perform the indicated functions, including computers, network devices, internet appliances, PDAs, wireless phones, pagers, etc. The computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or in storage while being used, these items or portions of them may be transferred between memory and other storage devices for purposes of memory management and data integrity. Alternatively, in other embodiments some or all of the software components may execute in memory on another device and communicate with the illustrated computer system 900 via inter-computer communication. Some or all of the system components or data structures may also be stored (e.g., as instructions or structured data) on a computer-accessible medium or a portable article to be read by an appropriate drive. In some embodiments, instructions stored on a computer-accessible medium separate from computer system 900 may be transmitted to the computer system 900 via transmission media or signals such as electrical, electromagnetic, or digital signals, conveyed via a communication medium such as a network wired and/or wireless link. Various embodiments may further include receiving, sending or storing instructions and/or data implemented in accordance with the foregoing description upon a computer-accessible medium. Accordingly, the invention may be practiced with other computer system configurations.

The various embodiments may further include receiving, sending or storing instructions and/or data implemented in accordance with the foregoing description of a computer-accessible medium. Generally speaking, a computer-accessible medium may include storage media or memory media such as magnetic or optical media, e.g., disk or CD-ROM, DVD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

While various embodiments of the invention have been described, it will be apparent to those of ordinary skill in the art that many more embodiments and implementations are possible that are within the scope of this invention.

What is claimed is:

1. A method of anonymizing personalized event data, comprising the steps of:
    receiving the personalized event data further comprising event data and an encrypted personal identifier;
    determining, whether an entry exists for the encrypted personal identifier in a key database of the data system in which the encrypted personal identifier is associated with a system identifier that uniquely identifies the encrypted personal identifier in the data system and where the encrypted personal identifier is uniquely associated to the one system identifier;
    determining where if no entry is detected in the key database for the received encrypted personal identifier then:
    generating a new entry for the key database in which the received encrypted personal identifier is uniquely associated to a new system identifier;
    storing the received encrypted personal identifier associated to the new system identifier as the new entry in the key database;
    storing the new system identifier associated to the event data contained in the personalized event data in an event database and storing the system identifiers in association with the corresponding event data;
    determining whether an entry exists for the encrypted personal identifier in the key database is carried out on a basis of a ciphertext of the encrypted personal identifier;
    encrypting the ciphertext of received encrypted personal identifier by the data system using asymmetric encryption before it is determined whether an entry exists in the key database for the encrypted personal identifier and where the encrypted personal identifiers contained in the entries of the key database were encrypted by the data system using the same asymmetric encryption before storing; and
    automatically deleting a key used for asymmetric encryption of the ciphertext when a request for a data output other than the new system identifier or event data is detected.

2. The method according to claim 1, where the personalized event data comprises the encrypted personal identifier and a date when the event occurred.

3. The method according to claim 2, where the date contained in the event database is replaced by a time identifier which uniquely identifies a certain date where the time identifier is designed in such a way that no conclusions are possible to deduce the date from the time identifier.

4. The method according to claim 2, further comprising determining if an event request is received requesting information about events occurring at a time interval included in the event request, the event elements in the event database have a date lying in the time interval are determined and stored in an event list, where the event list is output in response to the event request.

5. The method according to claim 2, further comprising determining whether an event element in the event database is associated with a date that is older than a predefined date, where any event element in the event database having a date that is older than the predefined date is automatically deleted.

6. The method according to claim 1, further comprising determining if an entry is detected in the key database for the received encrypted personal identifier, and if so, the system identifier associated with the received encrypted personal identifier is determined and the event data is stored in the event database as an event element where the system identifier is associated with the event data containing at least a date when the event occurred.

7. The method according to claim 6, further comprising determining whether the time interval contained in the event request is lying in a predefined system time interval predefined in the data system, where if it is determined that the time interval contained in the event request is not inside the predefined system time interval, the access to the event database in response to the event request is denied.

8. The method according to claim 1, further comprising where in a first time interval a first new system identifier is generated for the received encrypted personal identifier where for a different time interval a second new system identifier is generated for the same encrypted personal identifier that is different from the first new personal identifier.

9. A data system configured to anonymize personalized event data, the system comprising:
    a key database that stores encrypted personal identifiers in association with a corresponding system identifier which uniquely identifies the encrypted personal identifier in the data system and where each encrypted personal identifier is uniquely associated to one system identifier;
    a receiver that receives the personalized event data, where the personalized event data further comprises an encrypted personal identifier and event data;
    a computer with a processor that can determine whether an entry exists for the encrypted personal identifier in the key database, where if the computer determines that no entry is detected in the key database for the received encrypted personal identifier, the computer generates a new entry for the key database in which the received encrypted personal identifier is uniquely associated to a new system identifier, where the computer can store the received encrypted personal identifier associated to the new personal system identifier as the new entry in the key database, and the computer can store the new system identifier associated to the event data contained in the personalized event data in an event database, the event database storing system identifiers in association with the corresponding event data and where the computer automatically deletes a key used for the asymmetric encryption of the ciphertext when a request for a data output other than the new system identifier or event data is detected; and
    an encryption module comprising a computer-accessible medium that is executable on the computer that can encrypt the ciphertext of received encrypted personal identifier using asymmetric encryption before the computer determines whether an entry exists in the key database for the encrypted personal identifier, where the encryption module encrypts the ciphertext of the encrypted personal identifiers contained in the entries of the key database using the same asymmetric encryption before the entries are stored in the key database.

10. The data system according to claim 9, where the encryption module can generate a new key used for the asymmetric encryption each time the data system is started.

11. The data system according to claim 9, where the event database comprises event elements further comprising the system identifier associated with the event data and the event data comprising a date when the event took place.

12. The data system according to claim 11, where if the computer detects an entry in the key database for the received encrypted personal identifier, the computer can determine the system identifier associated with the received encrypted personal identifier and to store the event data in the event database as an event element in which the system identifier is associated with the event data.

13. The data system according to claim 9, where the computer can detect if a request other than the event request is detected.

14. The data system according to claim 13, where the computer can delete at least one of the key database and event database when it detects the request other than the event request.

15. The data system according to any of claim 9, where the key database is stored in non-persistent memory location.

16. The data system according to any of claim 9, where the event database is stored in non-persistent memory location.

* * * * *